United States Patent [19]

Frye et al.

[11] Patent Number: 5,091,162

[45] Date of Patent: Feb. 25, 1992

[54] PERHYDROSILOXANE COPOLYMERS AND THEIR USE AS COATING MATERIALS

[75] Inventors: Cecil L. Frye; Loren A. Haluska, both of Midland, Mich.; Keith D. Weiss, Cary, N.C.; Ronald H. Baney, Midland, Mich.

[73] Assignee: Dow Corning Corporation, Midland, Mich.

[21] Appl. No.: 590,751

[22] Filed: Oct. 1, 1990

[51] Int. Cl.$^5$ .............................................. C01B 31/113
[52] U.S. Cl. ................................... 423/325; 423/347; 502/232; 528/31
[58] Field of Search ....................... 423/325, 324, 347; 502/232; 556/457, 451; 528/31

[56] References Cited

U.S. PATENT DOCUMENTS

| | | | |
|---|---|---|---|
| 2,547,678 | 3/1951 | Wilcox et al. | 260/448.2 |
| 3,615,272 | 10/1971 | Collins et al. | 23/366 |
| 3,992,426 | 11/1976 | Johnson et al. | 260/448.2 |
| 4,756,977 | 7/1988 | Haluska et al. | 428/704 |

FOREIGN PATENT DOCUMENTS 60-86017  5/1985  Japan .

OTHER PUBLICATIONS

Seyferth et al., "Cyclic Polysioloxanes from the Hydrolysis of Dichlorosilane", Inorg. Chem., 22, 2163-67 (1983).

*Primary Examiner*—Olik Chaudhuri
*Assistant Examiner*—Ken Horton
*Attorney, Agent, or Firm*—Roger E. Gobrogge

[57] ABSTRACT

The present invention relates to soluble perhydrosiloxane copolymers of the formula $[H_2SiO]_x[HSiO_{3/2}]_y$ wherein the mole fractions x and y total 1. In addition, the present invention relates to the use of these novel copolymers as coating materials, especially for use on electronic devices.

12 Claims, No Drawings

PERHYDROSILOXANE COPOLYMERS AND THEIR USE AS COATING MATERIALS

BACKGROUND

The present invention relates to soluble perhydrosiloxane copolymers of the formula $[H_2SiO]_x[HSiO_{3/2}]_y$ wherein the mole fractions x and y total 1. In addition the present invention relates to the use of these novel copolymers as coating materials especially for use on electronic devices.

Soluble hydridosiloxane polymers are known in the art. For instance, Collins et al. in U.S. Pat. No. 3,615,272 describe soluble hydrogen silsesquioxane resin of the formula $[HSiO_{3/2}]_n$ which is produced by the hydrolysis of a trichlorosilane, trimethoxysilane or triacetoxysilane in a hydrolysis medium formed by the reaction of concentrated sulfuric acid with an aromatic hydrocarbon.

Similarly, Japanese Kokai Patent 60[1985]-86017 describes a method of forming a soluble polydihydrogensilsesquioxane resin. This method comprises dissolving trichlorosilane in a previously water saturated solvent and then bubbling an inert gas accompanied by water vapor through the solution to hydrolyze and polycondense the silane. The resultant material was then sylated to form end-blockers.

Additionally, Wilcock et al. in U.S. Pat. No. 2,547,678 describe the production of linear, liquid dihydropolysiloxanes wherein substantially all of the valences o the silicon atoms between the terminal silicon atoms are satisfied by having two hydrogen atoms attached thereto. The method described therein comprises hydrolyzing halosilanes with an excess of water and recovering the polysiloxane.

Numerous hydridosiloxane copolymers are also known in the art. For instance, Johnson et al. in U.S. Pat. No. 3,992,426 describe a quadripolymer of the formula $R_3SiO(R_2SiO)_a(RHSiO)_b(H_2SiO)_cSiR_3$. Additionally, Seyferth et al. in inorganic chemistry, Vol. 22 (1983), pages 2163-67 describe copolymers containing varying proportions of $(H_2SiO)$, $(CH_3SiHO)$ and $[(CH_3)_2SiO]$.

The art also teaches that thin film ceramic coatings derived from hydrogen silsesquioxane resin can be applied on various substrates including electronic devices and circuits. For instance, Haluska et al. in U.S. Pat. No. 4,756,977 disclose silica coatings produced by applying a solution of hydrogen silsesquioxane to a substrate followed by conversion of the resin to silica by heating to temperatures of 200°-1000° C. The ceramic coatings produced by this method are taught to have many desirable characteristics such as microhardness, moisture resistance, ion barrier, adhesion, ductility, tensile strength, low electrical conductance and thermal expansion coefficient matching that make such coatings especially valuable.

The inventors herein have now discovered novel, soluble perhydrosiloxane copolymers described by the formula $[H_2SiO]_x[HSiO_{3/2}]_y$ which are useful for forming coatings on various substrates, especially electronic devices.

SUMMARY OF THE INVENTION

The present invention relates to siloxane copolymers of the chemical formula $[H_2SiO]_x[HSiO_{3/2}]_y$ wherein the mole fractions x and y total 1 and especially to copolymers wherein x is about 0.01 to about 0.1.

The invention also relates to a method of forming a ceramic coating on a substrate. The method comprises coating the substrate with a solution comprising a solvent and a siloxane copolymer of the chemical formula $[H_2SiO]_x[HSiO_{3/2}]_y$ wherein the mole fractions x and y total 1. The solvent is evaporated to deposit a preceramic coating on the substrate and the preceramic coating is then subjected to a temperature sufficient to facilitate conversion of the preceramic coating to a ceramic coating.

DETAILED DESCRIPTION

The present invention relates to novel copolymers of the formula $[H_2SiO]_x[HSiO_{3/2}]_y$, wherein the mole fractions x and y total 1. Preferably the mole fraction x is less than about 0.1 and the mole fraction y is greater than about 0.9. Most preferably, the mole fraction x is about 0.05 and the mole fraction y is about 0.95.

The cure characteristics of the above copolymers make them particularly useful for the deposition of coatings on many substrates. For instance, since these copolymers contain more Si—H than the hydrogen silsesquioxane resins described by Collins et al. supra, they can be oxidized to silica more easily and at lower temperatures. In addition, since the inventors herein have discovered that hydrogen silsesquioxane resin undergos a redistribution reaction to form $(H_2SiO)_x$-$(HSiO_{3/2})_y(SiO_{4/2})_z$ during oxidation, the copolymer claimed herein should be oxidized more rapid than said hydrogen silsesquioxane. Furthermore, when coatings formed from these copolymers are oxidized, they tend to contract less than those derived from hydrogen silsesquioxane. As such, there is generally less thermally induced coating stress and, thus, the coatings are less prone to cracking.

Because of the above characteristics, substrates which may advantageously be covered include electronic devices, electronic circuits or plastics including, for example, polyimides, epoxides, polytetrafluoroethylene and copolymers thereof, polycarbonates, acrylics and polyesters. However, the choice of substrates and devices to be coated by the instant invention is limited only by the need for thermal and chemical stability of the substrate at the temperature and atmosphere used in the present invention. The coatings taught herein also may serve as interlevel dielectric layers, doped dielectric layers to produce transistor like devices, pigment loaded binder systems containing silicon to produce capacitor and capacitor like devices, multilayer devices, 3-D devices, silicon on insulator devices, super lattice devices, protective layers for high temperature superconductors and the like.

In the present invention the expression "silica" includes amorphous silica as well as ceramic silica-like materials that are not fully free of residual hydrogen or silanol but are otherwise ceramic in character. The expressions "electronic device" or "electronic circuit" include, but are not limited to, silicon based devices, gallium arsenide based devices, focal plane arrays optoelectronic devices, photovoltaic cells and optical devices.

The novel copolymers of this invention are formed by a "scarce water" hydrolysis procedure. Variations of this procedure are described in U.S. Pat. No. 3,615,272 granted to Collins et al. and U.S. Pat. No. 5,010,159 in the name of Bank et al., both of which are hereby incorporated by reference. Essentially, such a hydrolysis involves:

forming a hydrolysis medium containing an arylsulfonic acid hydrate, adding $HSiX_3$ and $H_2SiX_2$ to the agitated hydrolysis medium, wherein X can be the same or different and can include any hydrolyzable group, facilitating hydrolysis of the $HSiX_3$ and $H_2SiX_2$ in the hydrolysis medium to form the copolymer, settling the hydrolysis medium and copolymer into immiscible layers comprising an acid layer and an organic layer where the organic layer contains the copolymer, and separating the organic layer from the acid layer.

The amount of $HSiX_3$ and $H_2SiX_2$ used in the above process can vary such that a copolymer with the desired mole fractions of each unit may be obtained. Preferably, greater than about 90 mole % $HSiX_3$ is used and, more preferably, about 95 mole % $HSiX_3$ is used.

Suitable hydrolyzable substituents (X) on the above silanes can include, for example, halogens, such as F, Cl, Br or I and organic groups linked to the silicon atom by oxygen bonds. The latter hydrolyzable groups can include, for example, organoxy (C—O—) or acyloxy

substituents such as alkoxy (e.g. methoxy, ethoxy, butoxy, or hexoxy), alkenyloxy (e.g. allyloxy), cycloalkoxy (e.g. cyclopentoxy or cyclohexoxy), aryloxy (e.g. phenoxy or naphthoxy), cycloalkenyloxy (e.g. cyclopentenyloxy) and acetoxy.

In addition to the above conventional hydrolyzable groups, the inventors herein have discovered that a phenyl group may be used in its stead. When subjected to the hydrolysis conditions described herein, these phenyl groups are cleaved and the polymeric unit is oxidized. Thus, a compound such as $H_2Si(C_6H_5)_2$ may result in the formation of a polymeric unit of the formula $[H_2SiO]$.

Preferably, the hydrolyzable groups in the above formula are halogens, with chlorines being most preferred. Upon hydrolysis, these groups yield hydrogen halides which facilitate both the hydrolysis of the compounds and the condensation of the hydrolyzates to a resin. Additionally, such hydrogen halides are easily removed from the product by washing.

The above silanes are generally added to the hydrolysis medium in the form of a liquid. This liquid may consist essentially of the silanes in their liquid state or it may comprise the silanes dissolved in any suitable hydrocarbon solvent or mixture of solvents such as dodecane, n-pentane, hexane, n-heptane, iso-octane, benzene, toluene, xylene, etc. If a solvent is to used, it is preferably an aromatic compound and, of these, toluene is the most preferred.

The hydrolysis medium comprises an arylsulfonic acid hydrate solution which may be formed by either dissolving the arylsulfonic acid hydrate in a solvent, such as an alcohol, or it may be generated by reacting an aromatic hydrocarbon with concentrated sulfuric acid. The latter sulfonation reaction, which is the preferred route to the above hydrolysis medium, can be represented as follows:

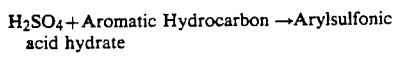

The arylsulfonic acid hydrate is used to donate the water necessary for silane hydrolysis as described below.

Since the kinetics of the above sulfonation reaction are controlled by the limited solubility of the aromatic hydrocarbon in sulfuric acid, vigorous mixing and heating increase both the rate and extent of reaction. In addition, since the presence of water in the hydrolysis medium (both the amount present in the sulfuric acid as well as that generated by the reaction) limits the sulfonation reaction, care to avoid its introduction will also propagate the reaction. Because the above factors (i.e. degree of mixing, temperature and quantity of water) make it difficult for 100% sulfonation to occur, it is preferred to employ enough sulfuric acid and aromatic hydrocarbon to generate at least about 200 percent of the water necessary for hydrolysis if 100 percent sulfonation were to occur.

The concentrated sulfuric acid utilized in generating the hydrolysis medium may contain up to 10 percent water, e.g. industrial grade, but, as discussed supra, the excess water may affect the rate and extent of the sulfonation reaction. Therefore, in a preferred embodiment of the invention fuming sulfuric acid may be used to consume excess water in the concentrated sulfuric acid prior to its introduction into the hydrolysis medium.

The aromatic hydrocarbons used in the sulfonation reaction can include compounds such as benzene, toluene, xylene and the like. Benzene and toluene are preferred because of their low boiling points which allow them to be easily evaporated to recover the product. Toluene is the most preferred hydrocarbon as it lacks the known toxicities and hazards associated with handling benzene.

When the silanes are added to the hydrolysis medium, the following reaction occurs:

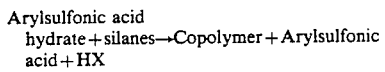

wherein X is the hydrolyzable group defined supra. Since the silane hydrolysis most likely occurs at the interface of the above organic and acid phases, the hydrolysis medium is agitated during silane addition to increase the surface area of reaction. It is preferred that the silane addition proceed via a slow flow below the liquid surface to reduce the formation of resinous residues on the walls of the reaction vessel which occur as a result of the evolution of gaseous products. Upon addition of the silanes, various facilitating measures such as continued vigorous mixing and temperature control are maintained to insure efficient hydrolysis.

Formation of the arylsulfonic acid hydrate hydrolysis solution may either precede the introduction of the silanes or it may occur concomitantly with the hydrolysis. However, control of the reaction temperature is more complex during concomitant addition due to the exothermic nature of the sulfonation reaction. Accordingly, it is preferred to generate the arylsulfonic acid hydrate prior to hydrolysis of the silane, thereby allowing one to more effectively control the rate and temperature of hydrolysis by external heating or cooling.

After the hydrolysis reaction is complete and the copolymer formed, the mixture is phase separated by settling. This process may, for example be accomplished by merely ceasing agitation of the hydrolysis mixture and allowing it to spontaneously separate into immiscible layers in the reaction vessel. The layers thus formed comprise an organic layer which contains the copolymer and the organic solvent and an acid layer.

The organic layer is then separated from the acid layer. The separation may be accomplished by any convenient means such as draining off one or the other of the layers. Since the lower layer is generally the acid, it may be most beneficial, for example, to draw off this layer and retain the copolymer in the reaction vessel.

The copolymer formed by the above process is generally acidic in character and, thus, it is often necessary or desirable to neutralize it before use. Neutralization may be effected by washing the copolymer, contacting it with a neutralizing agent, or a combination of the two. The latter mechanism is generally preferred since many of the acidic reaction byproducts are removed by the wash and the remainder are eliminated by a small quantity of neutralizing agent.

If the organic layer is to be washed, the preferred wash solution is an aqueous sulfuric acid solution since it inhibits emulsion formation which may occur as a result of the surfactant nature of the copolymer and the arylsulfonic acid byproduct. Wash solutions containing greater than 5% sulfuric acid (e.g. 50%) are generally operable.

The organic layer, either washed or unwashed, may then be contacted with a neutralizing agent, preferably in the presence of a small quantity of water which promotes hydrolysis of any remaining silane. The neutralizing agent must be sufficiently basic to neutralize any remaining acid species such as sulfuric acid, arylsufonic acid, $SiOSO_2H$, $SiOSO_2R$, hydrogen halides, organic acids etc., and yet insufficiently basic to catalyze rearrangement of the copolymer or solvolysis of the silicon hydrides.

Suitable bases which do not cause the above detrimental effects are suggested by Bank et al. supra. Examples include calcium carbonate, sodium carbonate, sodium bicarbonate, ammonium carbonate, ammonia, calcium oxide or calcium hydroxide.

The base may be added to the organic phase in any form desired including the use of a solid, solution, aqueous dispersion or liquid. It has, however, been found that the best results may be obtained when the organic phase contacts the neutralizing agent for only a short time. This may be accomplished, for instance, by stirring in powdered neutralizing agent followed by filtration or by passing the organic phase over or through a bed of particulate neutralizing agent of a size which does not impede flow.

Removing the neutralizing agent from the organic phase yields a solution of the desired copolymeric product. In a preferred embodiment of the invention, this neutralized organic phase is then dried and/or filtered to insure that any water soluble salts formed during neutralization or any other insolubles are removed. This step is desirable since the inclusion of such salts or insolubles in the product may adversely affect the copolymer's properties. Any suitable drying agent such as magnesium sulfate, sodium sulfate or a 3 or 4 angstrom molecular sieve may be utilized.

The solid form of the copolymer may then be recovered by merely removing the solvent. The method of solvent removal is not critical and numerous approaches are well known in the art. For instance, a process comprising (1) distilling off the solvent at atmospheric pressure to form a concentrate containing 40–80% resin and (2) removing the remaining solvent under vacuum and mild heat (0.1–5 hours at 60-°–120° C.) may be utilized.

The copolymers formed by the above process are nearly fully condensed and, thus, are relatively hydroxyl free. Generally, silanol levels less than about 2000 ppm are achievable and silanol levels less than about 500 ppm are more preferred. In addition, these polymers are soluble in a variety of hydrocarbon solvents such as benzene, toluene xylene, hexane, pentane, heptane, octane and numerous others.

These novel copolymers are useful for applying coatings on various substrates including electronic devices. The method for coating application is as follows:

the substrate is coated with a solution comprising a solvent and the above copolymer;

the solvent is evaporated to deposit a preceramic coating on the substrate; and the preceramic coating is subjected to a temperature sufficient to facilitate conversion of the preceramic coating to a ceramic coating.

The above copolymer is initially dissolved in a solvent to form a solution for application. Various facilitating measures such as stirring and/or heat may be used to assist in this dissolution. The solvent to be used in the instant invention can be any agent or mixture of agents which will dissolve and stabilize the copolymer without altering the ceramic coating produced thereby. These solvents can include, for example, alcohols such as ethyl or isopropyl, aromatic hydrocarbons such as benzene or toluene, alkanes such as n-heptane or dodecane, ketones, cyclic dimethypolysiloxanes, esters or glycol ethers, in an amount sufficient to dissolve the above materials to low solids. For instance, enough of the above solvent can be included to form a 0.1–50 weight percent solution.

In addition to the above copolymers, the coating solution may also include a modifying ceramic oxide precursor. The modifying ceramic oxide precursors that can be used herein include compounds of various metals such as aluminum, titanium zirconium, tantalum, niobium and/or vanadium as well as various non-metallic compounds such as those of boron or phosphorous. The expression "modifying ceramic oxide precursor", therefore, includes such metal and non-metal compounds having one or more hydrolyzable groups bonded to the above metal or non-metal. Examples of hydrolyzable groups include, but are not limited to, alkoxy such as methoxy, ethoxy, propoxy etc., acyloxy, such as acetoxy, or other organic groups bonded to said metal or non-metal through an oxygen. These compositions must form soluble solutions when mixed with the copolymers and must be capable of being hydrolyzed, and subsequently pyrolyzed, at relatively low temperatures and relatively rapid reaction rates to form modifying ceramic oxide coatings. When such a modifying ceramic oxide precursor is used it is generally present in the preceramic mixture in an amount such that the final ceramic coating contains 0.1 to 30 percent by weight modifying ceramic oxide.

A platinum or rhodium catalysts may likewise be included in the above coating solution to increase the rate and extent of conversion of the copolymer to silica. Any platinum or rhodium compound or complex that can be solubilized in this solution will be operable. For instance, an organoplatinum composition such as platinum acetylacetonate or rhodium catalyst $RhCl_3[S(CH_2CH_2CH_2CH_3)_2]_3$, obtained from Dow Corning Corporation, Midland, Mich. are all within the scope of this invention. The above catalysts are generally added to the solution in an amount of between about 5 and 500 ppm platinum or rhodium based on the weight of copolymer.

The solution containing the copolymer, solvent and, optionally, a modifying ceramic oxide precursor and/or a platinum or rhodium catalyst is then coated onto the substrate. The method of coating can be, but is not limited to, spin coating, dip coating, spray coating or flow coating.

The solvent is allowed to evaporate resulting in the deposition of a preceramic coating. Any suitable means of evaporation may be used such as simple air drying by exposure to an ambient environment or by the application of a vacuum or mild heat. It is to be noted that when spin coating is used, an additional drying period is generally not necessary as the spinning drives off the solvent.

The preceramic coating applied by the above methods is then converted to a silica ($SiO_2$) coating by subjecting it to a temperature sufficient for ceramification. Generally this temperature is about 20° to about 1000° C. depending on the pyrolysis atmosphere. Higher temperatures usually result in quicker and more complete ceramification, but said temperatures also may have detrimental effects on various temperature sensitive substrates. The preceramic coatings are usually subjected to these temperatures for a time sufficient to ceramify the coating generally up to about 6 hours with a range of between about 0.5 and about 6 hours being preferred, and a range of between about 0.5 and 2 hours being more preferred.

The above heating may be conducted at any effective atmospheric pressure from vacuum to superatmospheric and under any effective gaseous environment such as those comprising air, $O_2$, an inert gas ($N_2$, etc. as disclosed in U.S. patent application No. 07/423,317 which is incorporated herein by reference), ammonia (as disclosed in U.S. Pat. No. 4,747,162 or U.S. patent application No. 07/532,828 which are both incorporated herein by reference), amines (as disclosed in U.S. patent application No. 07/532,705 which is incorporated herein by reference), etc. It is especially preferred, however, to heat under a wet ammonia atmosphere to hydrolyze the Si—H bonds and then under a dry ammonia atmosphere to effect removal of any remaining Si—OH groups.

Any method of heating such as the use of a convection oven or radiant or microwave energy is generally functional herein. The rate of heating, moreover, is also not critical, but it is most practical and preferred to heat as rapidly as possible.

By the above methods a thin (less than 2 microns) ceramic planarizing coating is produced on the substrate. The coating smooths the irregular surfaces of various substrates and has excellent adhesion. In addition, the coating may be covered by other coatings such as further $SiO_2$ coatings. $SiO_2$/modifying ceramic oxide layers, silicon containing coatings, silicon carbon containing coatings, silicon nitrogen containing coatings, silicon nitrogen carbon containing coatings and/or diamond like carbon coatings.

In a dual layer system, the second passivation layer may comprise silicon containing coatings, silicon carbon-containing coatings, silicon nitrogen-containing coatings, silicon carbon nitrogen containing coatings, an additional silicon dioxide coating (which may contain a modifying ceramic oxide) or a diamond-like carbon coating. In a triple layer system the second passivation layer may comprise silicon carbon-containing coatings, silicon nitrogen-containing coatings silicon carbon nitrogen containing coatings, an additional silicon dioxide coating (which may contain a modifying ceramic oxide), or a diamond-like carbon coating and the third barrier coating may comprise silicon coatings, silicon carbon-containing coatings, silicon nitrogen-containing coatings, silicon carbon nitrogen containing coatings, or a diamond-like carbon coating.

The silicon containing coating described above is applied by a method selected from the group consisting of (a) chemical vapor deposition of a silane, halosilane, halodisilane, halopolysilane or mixtures thereof, (b) plasma enhanced chemical vapor deposition of a silane, halosilane, halodisilane, halopolysilane or mixtures thereof or (c) metal assisted chemical vapor deposition of a silane, halosilane, halodisilane, halopolysilane or mixtures thereof. The silicon carbon coating is applied by a means selected from the group consisting of (1) chemical vapor deposition of a silane, alkylsilane, halosilane, halodisilane, halopolysilane or mixtures thereof in the presence of an alkane of one to six carbon atoms or an alkylsilane, (2) plasma enhanced chemical vapor deposition of a silane, alkylsilane, halosilane, halodisilane, halopolysilane or mixtures thereof in the presence of an alkane of one to six carbon atoms or an alkylsilane or (3) plasma enhanced chemical vapor deposition of a silacyclobutane or disilacyclobutane as further described in U.S. Pat. No. 5,011,706 which is incorporated herein in its entirety. The silicon nitrogen-containing coating is deposited by a means selected from the group consisting of (A) chemical vapor deposition of a silane, halosilane, halodisilane, halopolysilane or mixtures thereof in the presence of ammonia, (B) plasma enhanced chemical vapor deposition of a silane, halosilane, halodisilane, halopolysilane, or mixtures thereof in the presence of ammonia, (C) plasma enhanced chemical vapor deposition of a $SiH_4$—$N_2$ mixture such as that described by Ionic Systems or that of Katoh et al. in the Japanese Journal of Applied Physics, vol. 22, #5, pp. 1321-1323, (D) reactive sputtering such as that described in Semiconductor International, p 34, August 1987 or (E) ceramification of a silicon and nitrogen containing preceramic copolymer. The silicon carbon nitrogen-containing coating is deposited by a means selected from the group consisting of (i) chemical vapor deposition of hexamethyldisilazane, (ii) plasma enhanced chemical vapor deposition of hexamethyldisilazane (iii) chemical vapor deposition of silane, alkylsilane, halosilane, halodisilane, halopolysilane or mixture thereof in the presence of an alkane of one to six carbon atoms or an alkylsilane and further in the presence of ammonia, (iv) plasma enhanced chemical vapor deposition of a silane, alkylsilane, halosilane, halodisilane, halopolysilane or mixture thereof in the presence of an alkane of one to six carbon atoms or an alkylsilane and further in the presence of ammonia and (v) ceramification of a preceramic polymer solution comprising a carbon substituted polysilazane, polysilacyclobutasilazane or polycarbosilane in the presence of ammonia. The diamond-like carbon coatings can be applied by exposing the substrate to an argon beam containing a hydrocarbon in the manner described in NASA Tech Briefs. November 1989 or by one of the methods described by Spear in J. Am. Ceram. Soc., 72, 171-191 (1989). The silicon dioxide coating (which may contain a modifying ceramic oxide) is applied by the ceramification of a preceramic mixture comprising a silicon dioxide precursor (and a modifying ceramic oxide precursor) as in the initial coating.

Coatings produced by the instant invention possess low defect density and are useful on electronic devices as protective coatings, as corrosion resistant and abrasion resistant coatings, as temperature and moisture resistant coatings, as dielectric layers in, for instance, multilayer devices and as a diffusion barrier against ionic impurities such as sodium and chloride.

The following non-limiting examples are included so that one skilled in the art may more readily understand the invention.

EXAMPLE 1

A nitrogen purged reaction flask was charged with 750 mL (656 g) of benzene, 90 mL (166 g) of 95-96% sulfuric acid and 80 mL (147 g) fuming sulfuric acid (15% $SO_3$). An addition funnel was charged with 200 mL (175 g) of benzene and 7.0 mL (9.4 g) of trichlorosilane. 7.0 mL (8.5 g) of dichlorosilane was allowed to volitilize into the addition funnel. The contents of the addition funnel were added to the rapidly stirred reaction mixture over a period of 5 hours. The reaction was allowed to proceed ½ hour after this addition.

The resulting mixture was placed in a separatory funnel, the acid layer was discarded, and the organic layer was washed 5 times with mixtures of sulfuric acid and water (5:1, 2:1, 1:1, 1:2, and 1:5 respectively). The organic solution was washed 5 times with distilled water, filtered and the solvent allowed to evaporate. The resulting solid white copolymer was collected to yield 4.42 g (58%). The copolymer was found to be soluble in hydrocarbon and aromatic solvents. Proton NMR spectroscopy verified that the product had the formula $(H_2SiO)_1(HSiO)_{3/2})_{19}$.

EXAMPLE 2

2 Motorola 4011B CMOS devices were spin coated with the copolymer formed in Example 1 at 3000 RPM for 10 seconds. The devices were placed in a Lindberg furnace, and the temperature in the furnace raised to 400° C. Pyrolysis at 400° C. for 1 hour resulted in a bright and transparent coating.

The coated devices were placed in a salt chamber in accordance with method 1009.4 MIL-STD 883C. The devices remained effective in this environment for 5.0 and 11.5 hours under these conditions compared to a 0.2 hour device survival time with uncoated devices.

That which is claimed is:

1. A perhydrosiloxane copolymer of the chemical formula:

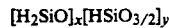

wherein the mole fractions x and y total 1.

2. The copolymer of claim 1 wherein x is about 0.01 to about 0.1.

3. The copolymer of claim 1 dissolved in a solvent selected from the group consisting of alcohols, aromatic hydrocarbons, alkanes, ketones, esters, cyclic dimethylpolysiloxanes or glycol ethers.

4. The copolymer solution of claim 3 which also contains a platinum or rhodium catalyst in an amount of about 5 to about 500 ppm platinum based on the weight of copolymer.

5. The copolymer solution of claim 3 which also contains a modifying ceramic oxide precursor comprising a compound containing an element selected from the group consisting of titanium, zirconium, aluminum, tantalum, vanadium, niobium, boron and phosphorous wherein the compound contains at least one hydrolyzable substituent selected from the group consisting of alkoxy or acyloxy and the compound is present in an amount such that the formed ceramic coating contains 0.1 to 30 percent by weight modifying ceramic oxide.

6. A method of forming a ceramic coating on a substrate comprising:
coating the substrate with a solution comprising a solvent and a perhydrosiloxane copolymer of the chemical formula:

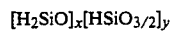

wherein the mole fractions x and y total 1;
evaporating the solvent to deposit a preceramic coating on the substrate; and
subjecting the preceramic coating to a temperature sufficient to facilitate conversion of the preceramic coating to a ceramic coating.

7. The method of claim 6 wherein the solvent is selected from the group consisting of alcohols, aromatic hydrocarbons, alkanes, ketones, esters or glycol ethers and is present in an amount sufficient to dissolve the copolymer to between about 0.1 and about 50 weight percent.

8. The method of claim 7 wherein the preceramic coating is subjected to a temperature of about 20 to about 1000° C. for up to about 6 hours.

9. The method of claim 8 wherein the preceramic coating is subjected to said temperature in an atmosphere selected from the group consisting of ammonia and amines.

10. The method of claim 7 wherein the solution also contains a modifying ceramic oxide precursor comprising a compound containing an element selected from the group consisting of titanium, zirconium, aluminum, tantalum, vanadium, niobium, boron and phosphorous wherein the compound contains at least one hydrolyzable substituent selected from the group consisting of alkoxy or acyloxy and the compound is present in an amount such that the formed ceramic coating contains 0.1 to 30 percent by weight modifying ceramic oxide.

11. The method of claim 7 wherein the solution also contains a platinum or rhodium catalyst in an amount of about 5 to about 500 ppm platinum based on the weight of copolymer.

12. The method of claim 10 wherein the solution also contains a platinum or rhodium catalyst in an amount of about 5 to about 500 ppm platinum based on the weight of copolymer.

* * * * *